United States Patent [19]

Bloemer et al.

[11] Patent Number: 5,775,555
[45] Date of Patent: *Jul. 7, 1998

[54] SINGLE ARM HOLDER AND BRACKET FOR BICYCLE RACK

[75] Inventors: John M. Bloemer, Madison, Wis.; John M. Kaloustian, Northville, Mich.; Todd W. Lassanske, Ridgeway, Wis.

[73] Assignee: Graber Products, Inc., Madison, Wis.

[*] Notice: The term of this patent shall not extend beyond the expiration date of Pat. No. 5,573,165.

[21] Appl. No.: 568,660

[22] Filed: Dec. 7, 1995

Related U.S. Application Data

[63] Continuation-in-part of Ser. No. 525,233, Sep. 8, 1995, abandoned, which is a continuation-in-part of Ser. No. 392,547, Feb. 17, 1995, Pat. No. 5,573,165.

[51] Int. Cl.$^6$ ............... B60R 9/10; B60R 9/12; B60R 9/06
[52] U.S. Cl. .......... 224/531; 224/502; 224/505; 224/537; 224/534; 224/532; 224/553; 224/924; 224/571
[58] Field of Search ............... 224/488, 495, 224/502, 504, 505–509, 518–521, 522, 523, 531–537, 545, 548, 553, 567–571, 917.5, 924

[56] References Cited

U.S. PATENT DOCUMENTS

| | | |
|---|---|---|
| 562,520 | 6/1896 | Fonda . |
| 577,910 | 3/1897 | Bierbach . |
| 2,512,267 | 6/1950 | Donnelley . |
| 2,803,349 | 8/1957 | Talbot ................. 211/22 |
| 3,794,227 | 2/1974 | Stearns ................. 224/532 |
| 3,877,622 | 4/1975 | McLain ................. 224/532 |

(List continued on next page.)

FOREIGN PATENT DOCUMENTS 2 278 819  12/1994  United Kingdom .

OTHER PUBLICATIONS

"Spare Logic™ #SL2000B: Two–Bike Spare Tire–Mount Carrier" brochure, Bard Wyers Sports, Inc.
"Quik Hitch™ #T–QH–4000: Multi–Fit 2 & 4 Bike Trailer Hitch Systems" brochure, Bard Wyers Sports, Inc.
"Voyager Rak #VTR2000: Two–Bike Trunk–Mount Carrier" brochure, Bard Wyers Sports, Inc.

(List continued on next page.)

*Primary Examiner*—Renee S. Luebke
*Assistant Examiner*—Gregory M. Vidovich
*Attorney, Agent, or Firm*—Lathrop & Clark

[57] ABSTRACT

An L-shaped support has a rearwardly extending tubular arm formed of a thin-walled tube. The end of vertical leg of the support is cold formed into a U-shaped, double-walled channel which fits between the sides of a brace which is rigidly mounted to the trailer hitch of a vehicle. A plastic bracket has a split ring clamp which fits over the rearwardly extending arm of the support. The entire bracket may pivot about the axis defined by the arm. An alternative embodiment attachment device for restraining a bicycle tube on a horizontally extending carrier arm is formed as a single molded part of thermoplastic rubber. The attachment device has a strap with an array of two rows of holes which engage with a square array of four mushroom-head type fasteners to attach the end of the strap to the attachment devices.

11 Claims, 15 Drawing Sheets

U.S. PATENT DOCUMENTS

| | | | |
|---|---|---|---|
| 4,116,341 | 9/1978 | Hebda | 211/17 |
| 4,452,385 | 6/1984 | Prosen | 224/321 |
| 4,513,897 | 4/1985 | Graber | 224/314 |
| 4,676,414 | 6/1987 | Deguevara . | |
| 4,875,608 | 10/1989 | Graber . | |
| 4,948,021 | 8/1990 | Murphy et al. . | |
| 4,997,116 | 3/1991 | Grim . | |
| 5,004,133 | 4/1991 | Wyers | 224/532 |
| 5,056,700 | 10/1991 | Blackburn et al. | 224/324 |
| 5,190,195 | 3/1993 | Fullhart et al. | 224/519 |
| 5,211,323 | 5/1993 | Chimenti et al. | 224/314 |
| 5,259,542 | 11/1993 | Newbold et al. | 224/324 |
| 5,282,555 | 2/1994 | Muir et al. | 224/924 |
| 5,284,282 | 2/1994 | Mottino | 224/924 |
| 5,303,857 | 4/1994 | Hewson | 224/520 |
| 5,305,936 | 4/1994 | Nusbaum | 224/324 |
| 5,330,084 | 7/1994 | Peters | 224/924 |
| 5,385,280 | 1/1995 | Littlepage et al. . | |
| 5,573,165 | 11/1996 | Bloemer et al. | 224/924 |

OTHER PUBLICATIONS

"Ski Logic#SLK4000: Ski Carrier System (4 pairs)" brochure. Bard Wyers Sports, Inc.

Graber USA 1995 Product Information and Compatibility Guide.

"T–REX Raks Easy to Use Built to Last", advertisement.

Slider Corp. Product Guide 1994. Slider Corp.

Draft Master Sport Racks, brochure, ANEW Development, Inc., Oregon.

1995 Rhode Gear catalog, 1994 Rhode Gear.

"Hoolywood™ Racks: Simple. Strong. Secure. 1994 Master Fit List" brochure.

1994 Thule® catalog.

Allen® 143A brochure, R.A. Allen Co., Inc., Lincoln, MA.

Allen® 104A brochure, R.A. Allen Co., Inc., Lincoln, MA.

Allen® 103A brochure, R.A. Allen Co., Inc., Lincoln, MA.

Stealth Rak™ #SR3000: Bumper–Mounted, 3–Bike Carriers, brochure, Bard Wyers Sports, Inc.

"Mini Stealth™ #MS2000: Two–Bike Bumper–Mount Carrier" brochure, Bard Wyers Sports, Inc.

"U–Haul Need A Hitch?", advertisement, U–Haul®Int'l, Jun. 1994.

Swagman, advertisement, Danik Industries Ltd., British Columbia, Canada.

DMC Products, Inc. Eugene, OR, advertisement from "Bicycle Retailer", Sep. 1994.

Piper Bike Racks Unsurpassed Stability, advertisement, King Roof, Inc., Taiwan.

Rak N Loc, "Keep Your Bikes Absolutely Safe", advertisement, B&S Enterprises.

Newslines, pp. 132–133, "Rear–Rack Market Booms As Quality, Features Improve", Sep. 1994, newspaper article.

Roto–Eze Quality Towing Accessories, advertisement, Roto–Eze.

"Click–On" and Performance XPORT advertisements.

"Barrecrafters Hitch Mounts", advertisements, Barrecrafters 1994–95, Shelburne, VT.

"Mount'N Bike Rack Lowering System", advertisement, Mount'N Inc., Orem, Utah.

Hollywood Racks, "Quality and Innovation", advertisement, from Bicycle Retailer, Apr. 1994.

SINGLE ARM HOLDER AND BRACKET FOR BICYCLE RACK

RELATED APPLICATION

This application is a continuation-in-part of U.S. patent application Ser. No. 08/525,233 filed Sep. 8, 1995, now abandoned which is a continuation-in-part of U.S. patent application Ser. No. 08/392,547, filed Feb. 17, 1995, now U.S. Pat. No. 5,573,165.

FIELD OF THE INVENTION

The present invention relates to an apparatus for carrying articles attached to a motor vehicle in general, and to an apparatus for carrying bicycles and skis on automobiles in particular.

BACKGROUND OF THE INVENTION

Recreational equipment, more particularly skis and bicycles, are often transported by the family motor vehicle. If the skier owns, rather than rents, skis, they must be routinely transported from the home to the ski slope. With the recent growth and development of recreational biking, bicycle riding is not only a means for traveling to a destination, but a recreational goal in itself. Indeed, active bicyclists often transport their bicycles to areas of interest, sometimes hundreds of miles from home, where novel scenery may be enjoyed without the need for long distance bicycling. The frequent bicyclist finds a routine need for convenient bicycle transport in the family vehicle to bike trails and bike sporting events. Only the largest trucks or cars can conveniently accommodate a bicycle or skis in the passenger compartment or trunk, and even then space for luggage and passengers is compromised. To address the need for convenient exterior transport, carrier racks have been developed.

Carrier racks are typically mounted either to the roof of a vehicle or over the trunk. A third option is a carrier mounted to a trailer hitch.

One type of conventional bike carrier employs an L-shaped tube or bracket mounted off the rear trailer hitch of a vehicle. The long leg of the L extends upwardly from the hitch and the short leg extends rearwardly of the hitch. One or more bike supporting brackets are generally mounted rigidly to the short leg of the tubular support. The bike mounting brackets extend substantially parallel to the ground and are typically in the form of a shallow trough or channel which is welded to the short leg of the tubular bracket.

Hitch mounted bike support brackets present a number of design challenges. The long leg of the L-shaped bracket is necessary to elevate the bike above the surface of the road. However, the long leg, in combination with the weight of the bike supported on the short leg can act as a lever arm resulting in high local stresses where the L-shaped bracket joins the trailer hitch. The lever arm effect of the long leg limits the number of bikes which can be carried because of the necessity of limiting the mechanical advantage caused by the rearward extension of the short leg to carry more bikes.

The second problem can be increased cost because of the complexity of the mechanical joint between the L-shaped tubular bracket and the trailer hitch necessitated by the high loads concentrated at the bracket/hitch interface.

What is needed is a vehicle carrier bracket which is adaptable to hold bicycles or skis, and can adjust the orientation of the bicycles or skis with respect to the carrier.

SUMMARY OF THE INVENTION

An L-shaped rearwardly extending tubular arm is formed of a bent, thin-walled tube. The downwardly extending end of the long leg of the bracket is cold formed into a U-shaped, double-walled channel which fits between the sides of a brace which is rigidly mounted to the trailer hitch of a vehicle. The cold formed transition between a large diameter thin-walled arm which is suited to resist bending loads transitions to a compact, structurally reinforced channel which can carry the stress concentrations associated with its mounting on the trailer hitch bracket. A bracket for mounting on the tubular carrier has a split ring clamp which fits over the short leg of the bracket. Extending from the bracket are wings with bike positioning surfaces thereon. Because the bracket is attached to the short arm of the tubular carrier by the split ring clamp, the entire bracket may pivot about the axis defined by the short arm. The pivoting of the bracket allows bikes to be more closely spaced on the bracket which in turn reduces the moment arm created by the bike on the attachment to the trailer hitch. This reduced moment arm allows more bikes to be carried on the tubular arm.

It is an object of the present invention to provide a bracket for use with a car mounted carrier which can be used for carrying bicycles and skis.

It is another object of the present invention to provide a bracket for use with a car mounted carrier which prevents pivoting or tilting of a supported bicycle.

It is a further object of the present invention to provide a bracket which may be selectively positioned so as to engage either a bicycle top tube or seat tube or front down tube.

It is another object of the present invention to provide a bracket which may be mounted with a plurality of like brackets on a horizontal support arm to compactly carry a plurality of bicycles.

It is an additional object of the present invention to provide a recreational equipment carrier which may be conveniently pivoted for access to a vehicle rear door.

It is a still further object of the present invention to provide a recreational equipment carrier which is positionably mountable to a vehicle rear-mounted spare tire support.

It is yet another object of the present invention to provide an economical one piece molded attachment device for engaging an element of a piece of recreational equipment to a horizontal carrier tube.

It is another object of the present invention to provide a recreational equipment carrier which allows convenient and fixable positioning of the orientation of the equipment with respect to the vehicle.

Further objects, features and advantages of the invention will be apparent from the following detailed description when taken in conjunction with the accompanying drawings.

DESCRIPTION OF THE PREFERRED EMBODIMENTS

Figure 1:
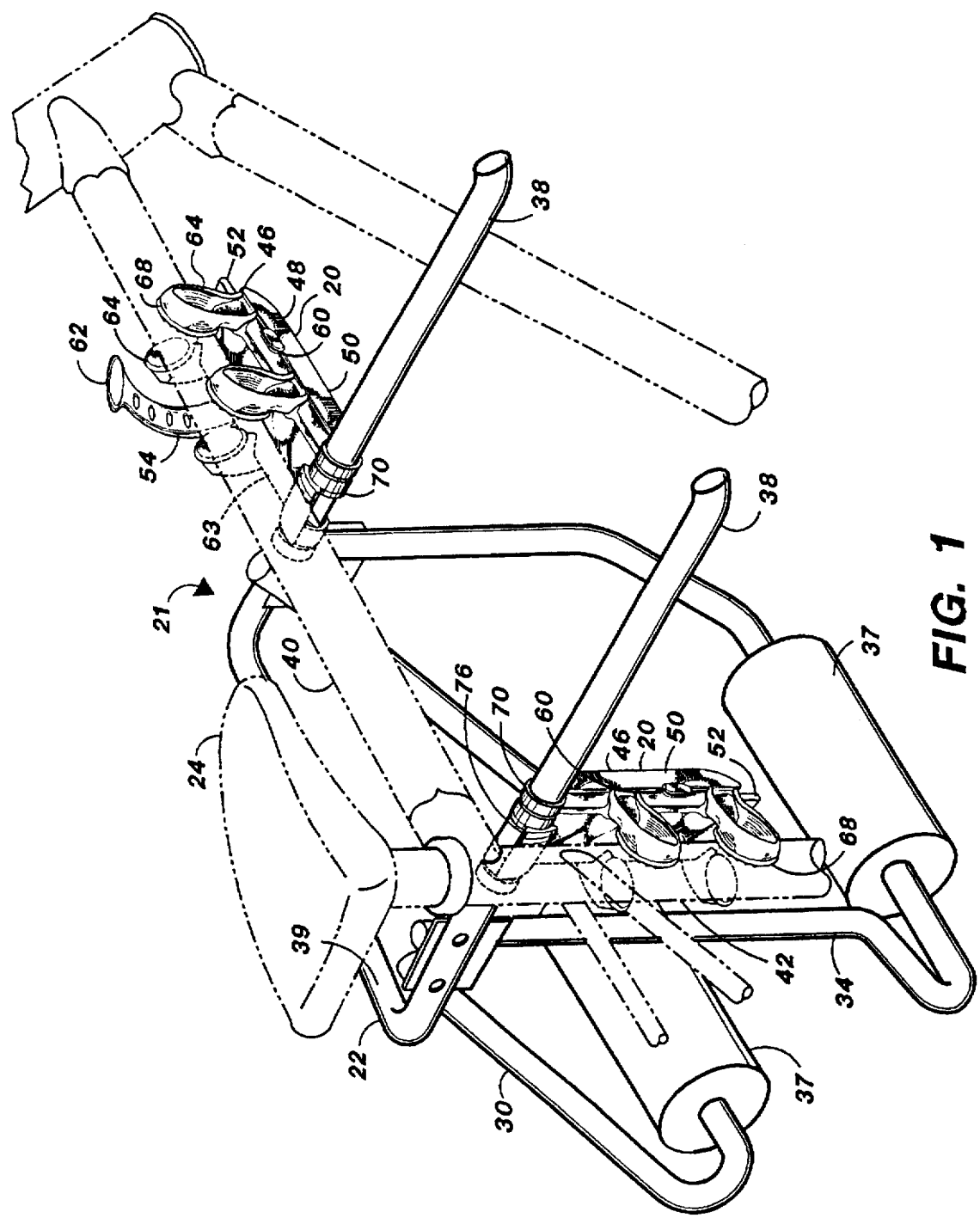
FIG. 1 is an isometric view of the brackets of this invention employed on a carrier rack to support a bicycle.
Figure 2:
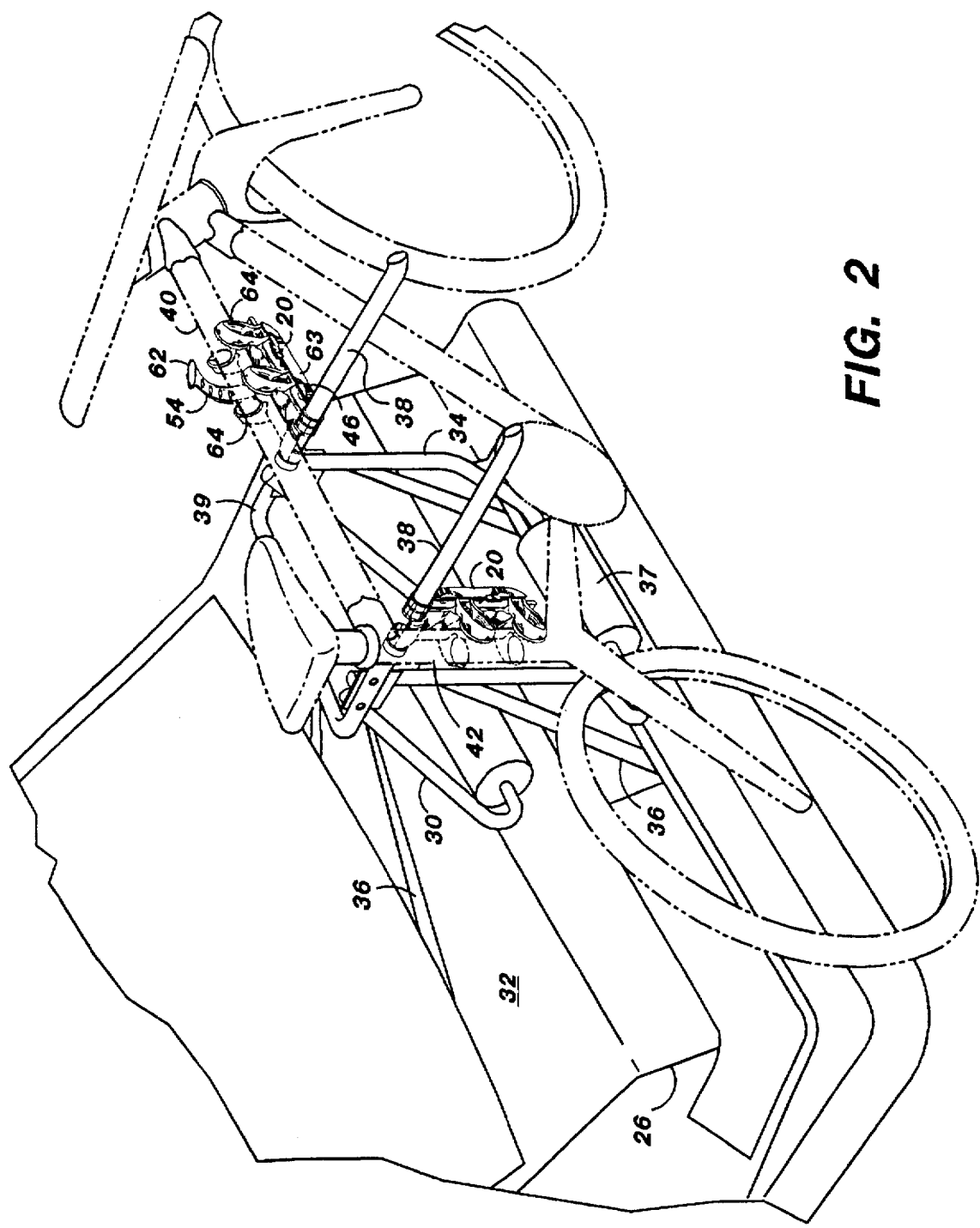
FIG. 2 is an isometric view of the carrier assembly of FIG. 1 mounted to the rear of a car.

Referring more particularly to FIGS. 1–23, wherein like numbers refer to similar parts, a carrier assembly 21 for the support of bicycles or skis is shown in FIG. 1. The carrier assembly 21 is composed of a plurality of brackets 20 of this invention which are mounted in pairs to a carrier rack 22, as shown in FIGS. 1 and 2. Carrier racks may take on a variety of configurations, but in general, the rack 22 has two rearwardly extending horizontal parallel arms 38. A bracket 20 is mounted to each arm 38, and together the brackets support either a bicycle 24, as shown in FIG. 1, or skis 44, as shown in FIG. 8. Although in a typical use multiple pairs of brackets 20 will be arrayed in spaced parallel relation along the arms 38 to support two or more bicycles on the rack 22, for clarity a single pair of brackets 20 has been illustrated.

The carrier rack 22 has a first U-shaped tubular member 30 which is engaged against the trunk 32 of the car 28, and a second U-shaped tubular member 34 which engages the rear 26 of the car 28. A strap 36 extends from each U-shaped member 30, 34 into the trunk, to therein restrain the carrier rack 22 from motion. The U-shaped members 30, 34 are cushioned by foam covers 37 to avoid marring of the automobile finish. The two horizontal arms 38 on which the brackets are mounted are portions of a third tubular member 39 which is connected to and supported by the two U-shaped members 30, 34.

Most modern bicycles 24, such as the example shown in FIG. 1, have a frame which includes a generally horizontal top tube 40 and a generally vertical seat tube 42. To both prevent front to back translation and pivoting of the bicycle, one bracket 20 engages the top tube 40 of the bicycle 24, while the other bracket 20 engages the seat tube 42 of the bicycle 24. Where the bracket 20 engages the top tube 40, it holds and positions the top tube 40 with respect to the carrier arm 38 and the carrier rack 22. The bracket 20 which engages the seat tube 42 holds the seat tube 42 fixed spatially with respect to the arm 38 and also prevents the bicycle from tilting or pivoting due to vehicular motion.

Identical brackets 20 can be used to grip either the top tube 40 or the seat tube 42. By employing identical brackets manufacturing and inventory costs are reduced. In addition, the utility of the carrier assembly is increased by allowing bicycles 24 to be mounted on the rack 22 with the front wheel to the right or to the left.

The carrier assembly 21 may be easily converted for use in transporting skis 44, as shown in FIG. 8, by sliding the brackets 20 off the arms 38 and flipping each bracket to present the ski support surfaces.

Figure 5:
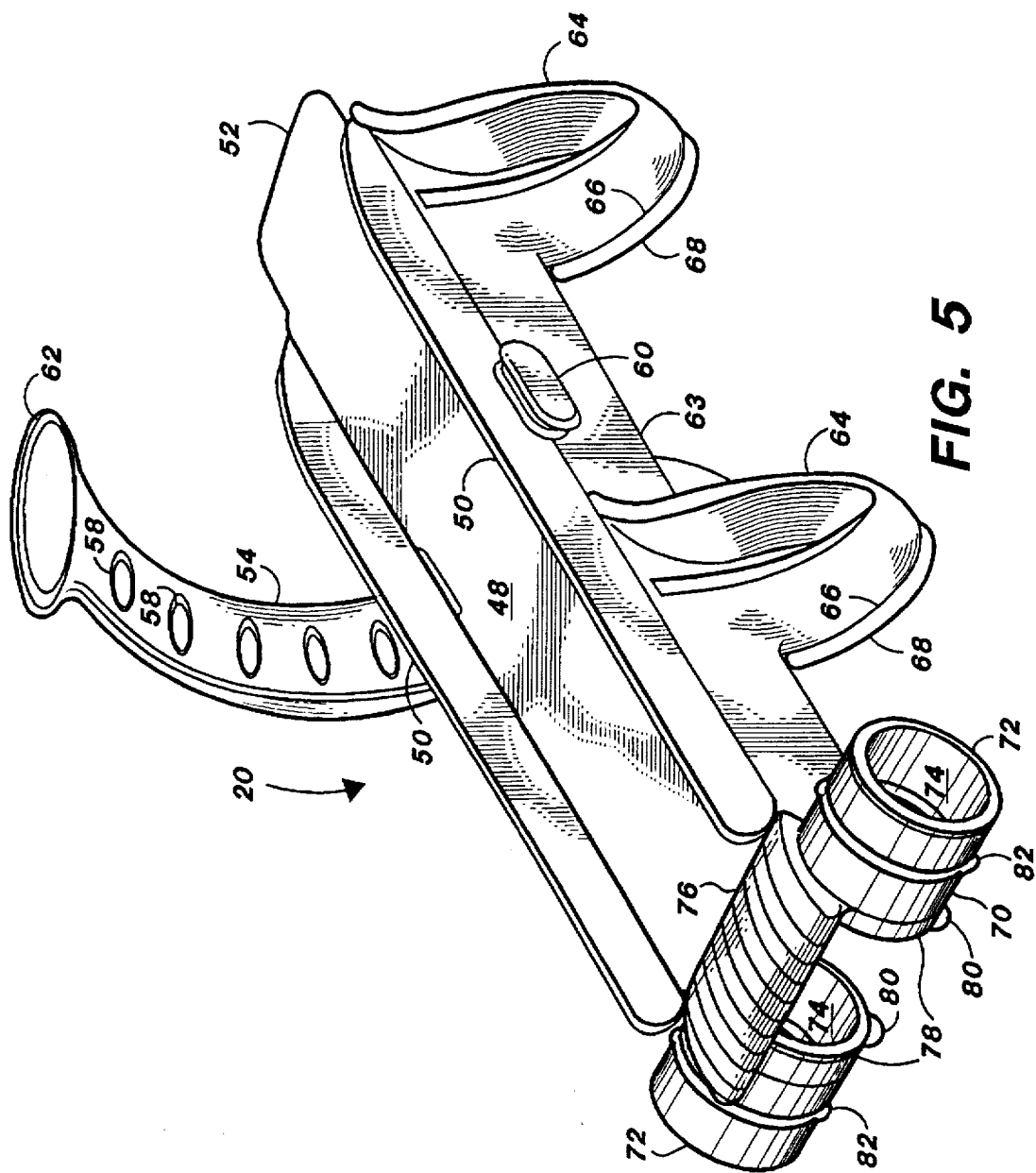
FIG. 5 is an isometric view of the bracket of FIG. 1 with the ski supporting surface face up.
Figure 6:
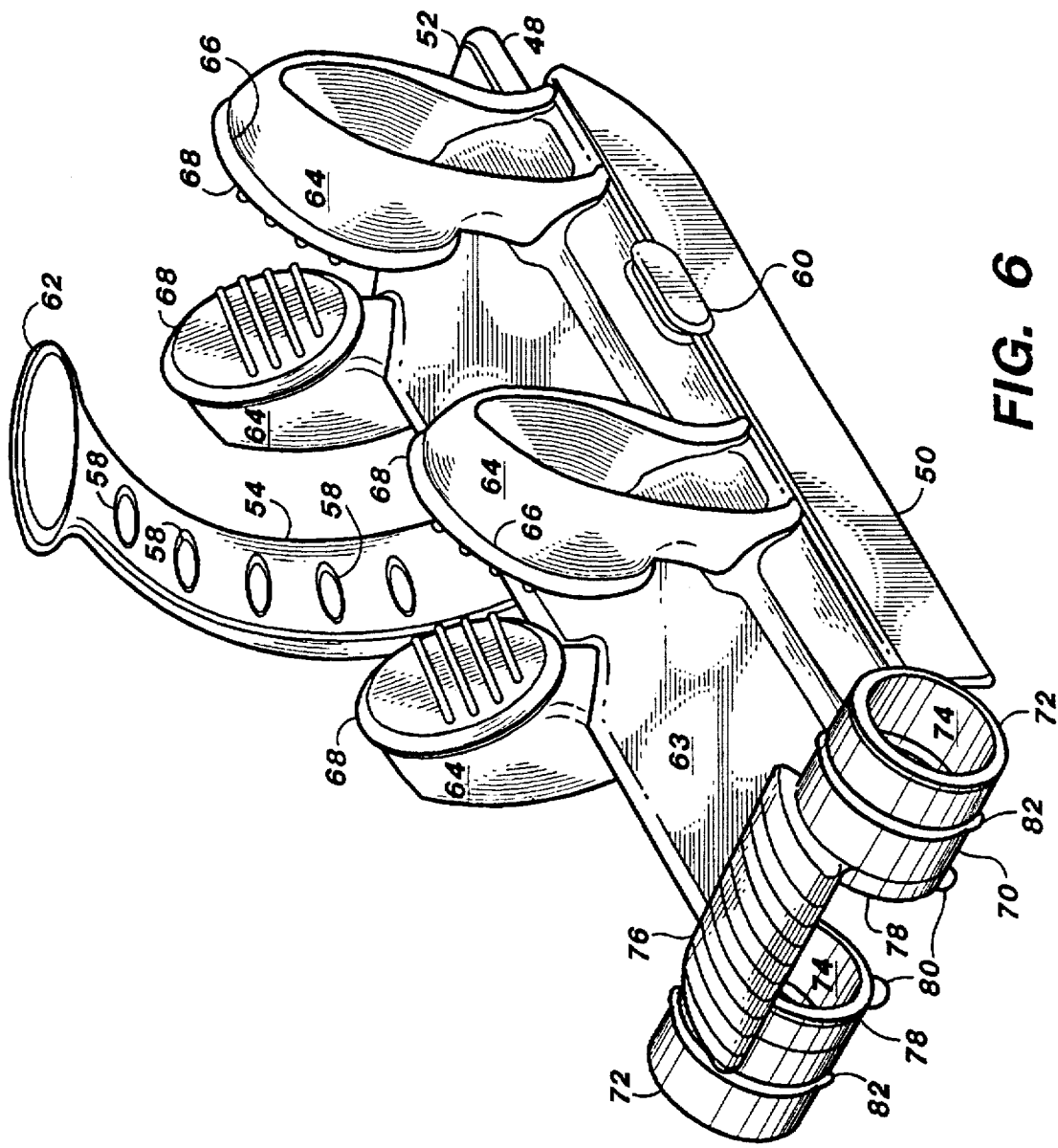
FIG. 6 is an isometric view of the bracket of FIG. 1 with the bike frame supporting side of the bracket face up.

Each bracket has a structural backbone or body 46 which is configured on a first side 48 to accept skis, as shown in FIG. 5, and is configured on a second side 63 to engage a bicycle frame tube, as shown in FIG. 6. The first side 48 of the body is flat to facilitate receiving and holding skis 44. Projecting ridges or rails 50 on either side of the flat side 48 retain and position narrow skis 44. Wider skis are supported on the tops of the rails 50 and are held in position by the straps 54 as shown in FIG. 8. Extending from the first side is a lip 52 which is sized to engage the toe portion 53 of a ski binding to properly position the skis 44 and to hold the skis while a rubber strap 54, shown in FIG. 6, is fastened about the skis to retain them on the bracket 20. The rubber strap 54 has a plurality of spaced apart holes 58, one of which is engaged by a strap hook 60 which projects from the body 46. The strap 54 is conveniently terminated by a tab 62 which facilitates stretching the strap 54 and looping one of the holes 58 over the hook 60. The tension in the strap 54 can be adjusted by selecting the hole 58 which is engaged with the hook 60.

The second side 63 of the body 46 has two pairs of opposed fingers 64 which are adapted to engage the frame tubes of a bicycle. Each finger 64 extends upwardly and outwardly from the body 46. The fingers 64 have inclined faces 66, the planes are defined by the inclined surfaces 66 of opposed fingers meeting at an angle of approximately 60°. The inclined surfaces 66 are covered with soft rubber pads 68 to facilitate gripping and holding without marring the frame members of a bicycle. The inclined pads 68 of the two pair of opposed fingers allow a single bracket to be used to support bicycle frame tubes of a wide range of diameters, as well as bicycle frame tubes which are circular, oval, or other shapes in section. As shown in FIG. 6, the strap 54 can be wrapped around the second side to retain a bicycle frame member between the opposed fingers 64.

A hinge is formed by two cylindrical members or rings 72 on the end 70 of the bracket 20 opposite the ski binding engaging lip 52. The rings 72 are aligned along a common axis about which the bracket 20 may pivot. The rings 72 allow the body to be positioned on the carrier rack, with an arm 38 extending through cylindrical openings 74 in the rings 72. To prevent sliding along the arm 38, a rubber member 76 is mounted between the cylindrical members 72 to frictionally engage the support arm 38. Cylindrical portions 78 of the rubber member 76 may be pulled away by tabs 80 from the support arm 38. The cylindrical portions 78 can be positioned by the tabs 80 over retaining ridges 82 on the rings 72, thus allowing the bracket 20 to rotate and slide freely on the arms 38 for positioning. When properly positioned further sliding of the bracket 20 on the arm 38 may be prevented by releasing the rubber cylindrical portions 78 to again grip the arm 38. The rubber member 76 also protects the bicycle frame from hitting the carrier arm 38.

Multiple brackets 20 can thus be mounted on the arms 38 of a carrier to support one, two or more bicycles, and may be flipped in orientation to alternatively support skis.

Figure 4:
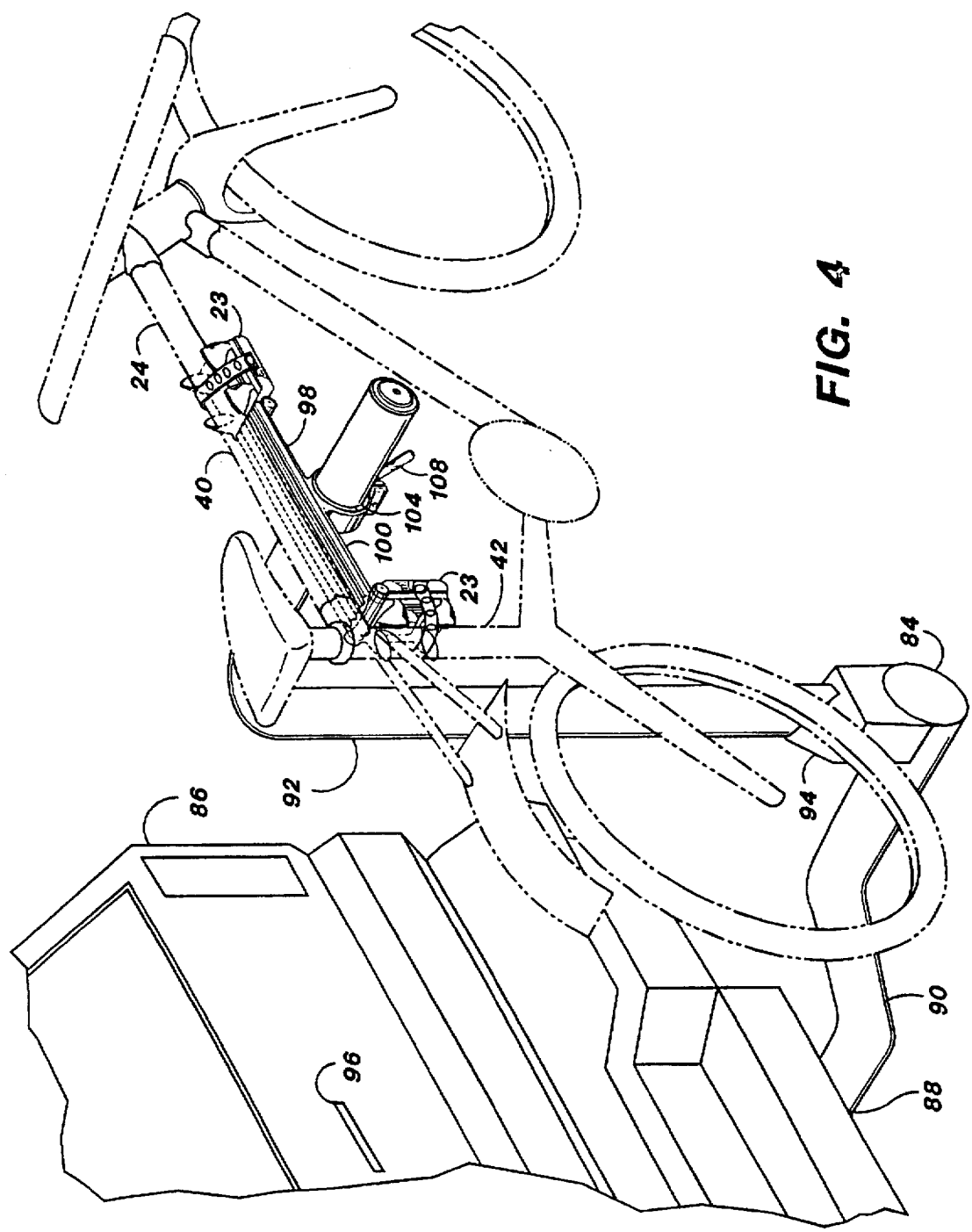
FIG. 4 is an isometric view of the carrier assembly of FIG. 3 mounted to a car.

Another type of equipment carrier 84 is illustrated in FIG. 4. The carrier 84 is designed to be utilized on a vehicle 86 which is equipped with a trailer hitch 88. The carrier 84 has a structural member 90 which engages with the hitch. An upstanding L-shaped support tube 92 mounted by a bracket 94 to the structural member 90. The bracket allows the L-shaped support member to pivot to facilitate opening the rear door 96 of the vehicle 86.

Figure 3:
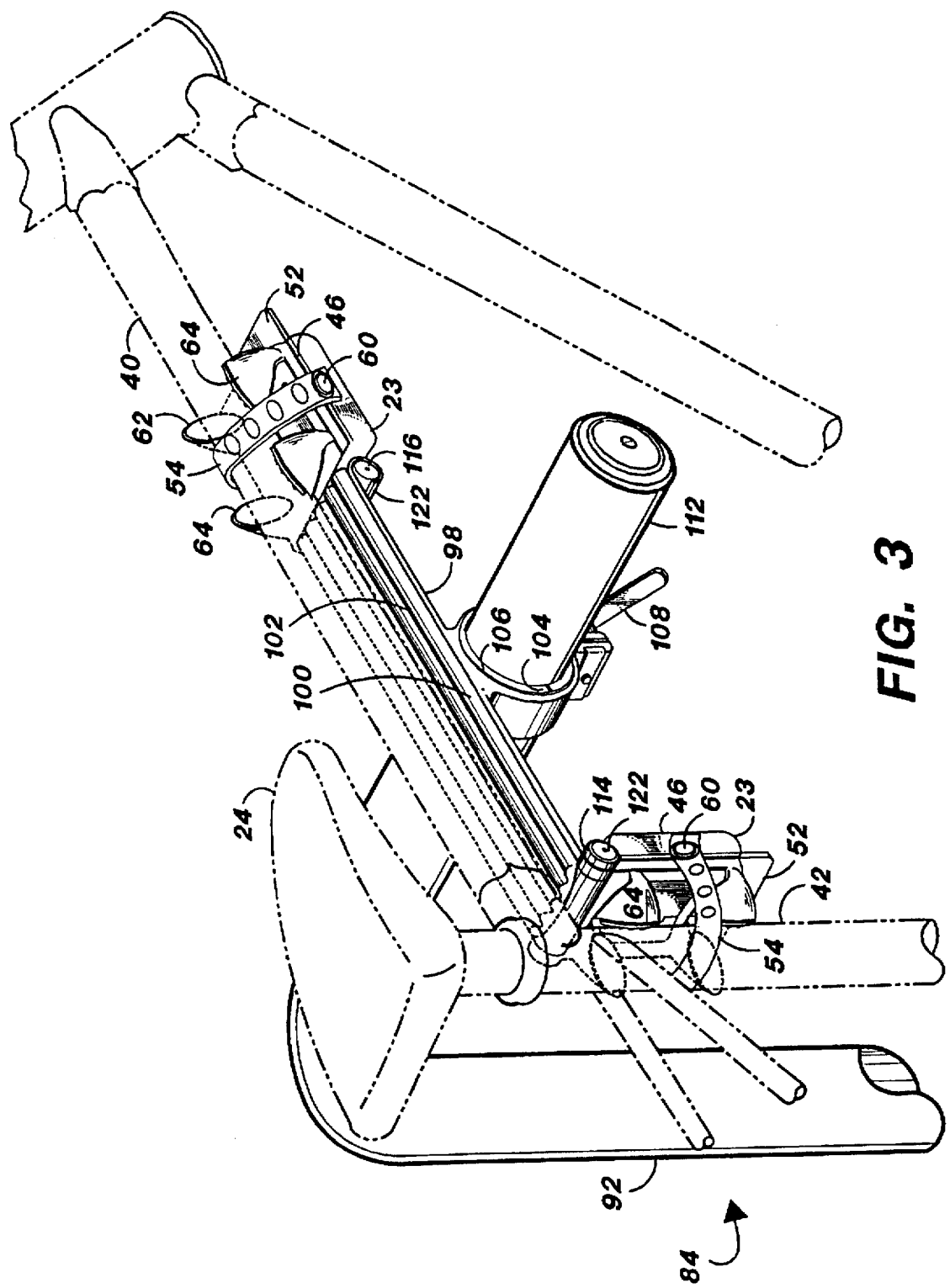
FIG. 3 is an isometric view of alternative embodiment carrier brackets mounted to a carrier and supporting a bicycle.
Figure 7:
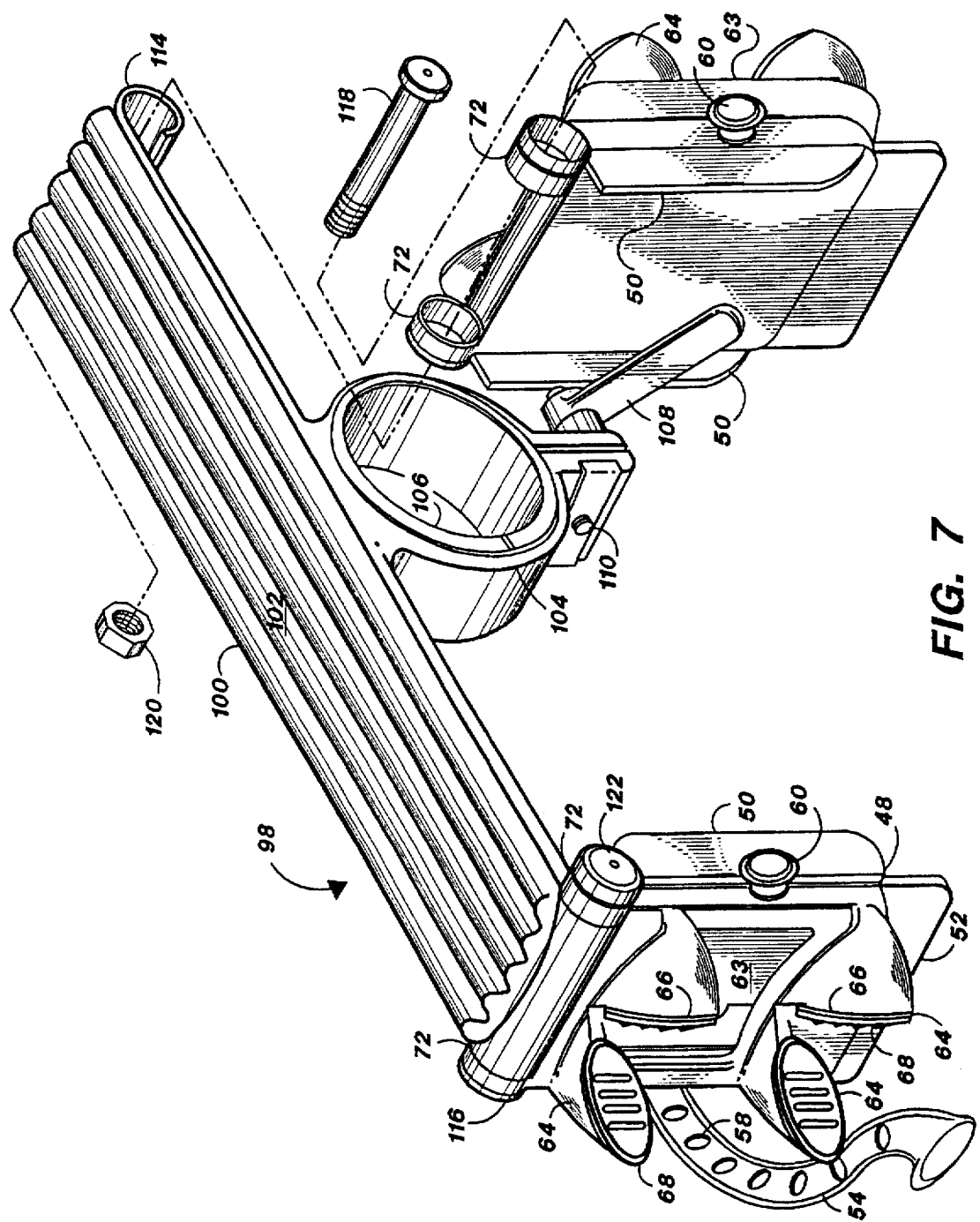
FIG. 7 is a partially exploded isometric view of the bracket of FIG. 3.
Figure 8:
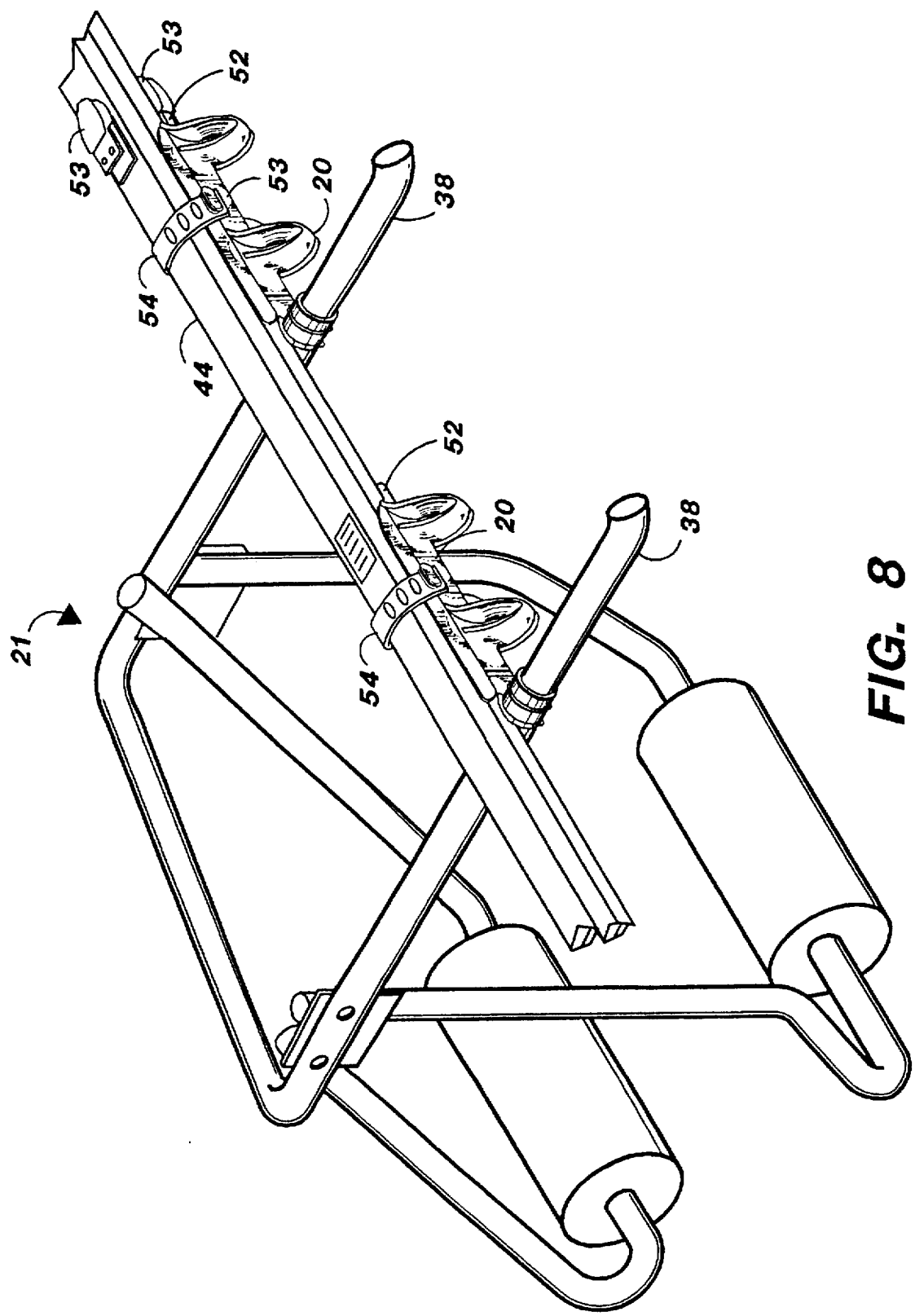
FIG. 8 is an isometric view of the bracket of FIG. 1 as deployed to carry skis.

For use with a carrier 84 having a single arm, as shown in FIGS. 3 and 7, two brackets 23 are joined by a soft surface deck 100 to form a composite carrier bracket 98. The composite carrier bracket 98 soft deck 100 is covered by a soft rubber extrusion 102. A lever operated clamp 104 is centrally mounted below the deck 100. The clamp 104 is lined with a grooved rubber liner 106. The split-ring clamp 104 has a locking handle 108. Turning the locking handle 108 causes a threaded member 110 to draw the two halves of the semicylindrical clamp 104 together, thereby causing the liner 106 to compress against the horizontally extending portion 112 of the L-shaped member 92.

The brackets 23, as shown in FIG. 7, are joined to the ends 114 and 116 of the deck 100 by hinged portions which form hinges with the cylindrical portions 72 of the brackets. The hinge pins forming the joints 122 are bolts 118 held in place by nuts 120. The hinged joints 122 formed by the hinge pins 118 and the ends 114, 116 and cylindrical portions 72 allow the positioning of the brackets 23, as shown in FIG. 3, to engage either the top tube 40 or the seat tube 42, thus providing both the retaining positioning functions as well as restricting the pivoting of the bicycle about a horizontal axis. Although a single composite carrier bracket 98 is shown mounted on the horizontal portion 112 of the L-member 92, two, three or more composite brackets 98 may be used to hold multiple bicycles.

Figure 9:
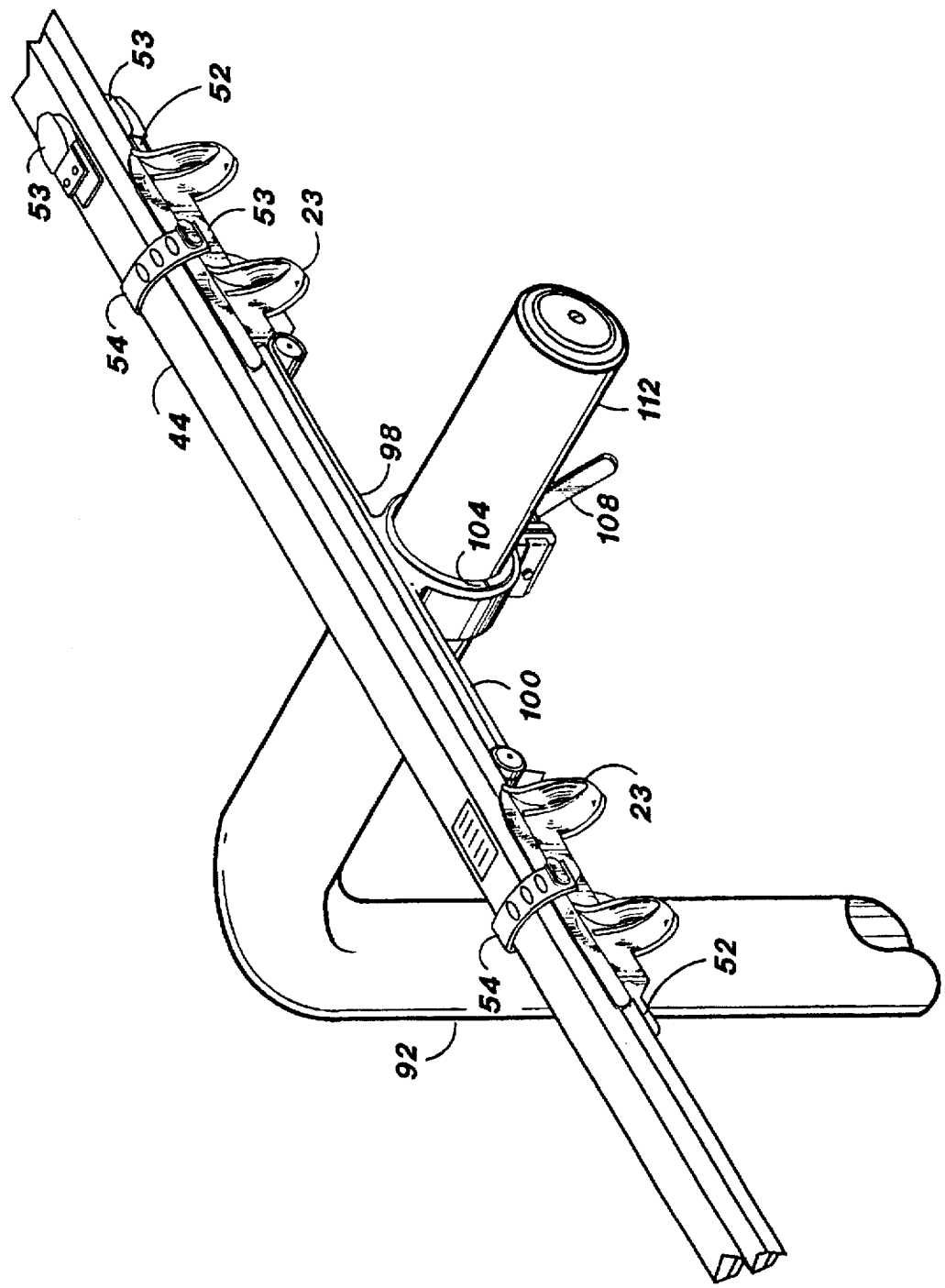
FIG. 9 is an isometric view of the bracket of FIG. 3 as deployed to carry skis.

As shown in FIG. 9, the brackets 23 may be reversed so that the flat sides 48 extend vertically for the carrying of skis. This is accomplished by removing the hinge pin or hinge bolts holding the brackets 23 and reconnecting them to the carrier bracket 98. The clamp 104 is loosened and the deck 100 is brought to a vertical position. The toe binding portion of the skis 53 is positioned against the lip 52. The lip 52 properly positions the skis on the carrier bracket 98.

Figure 10:
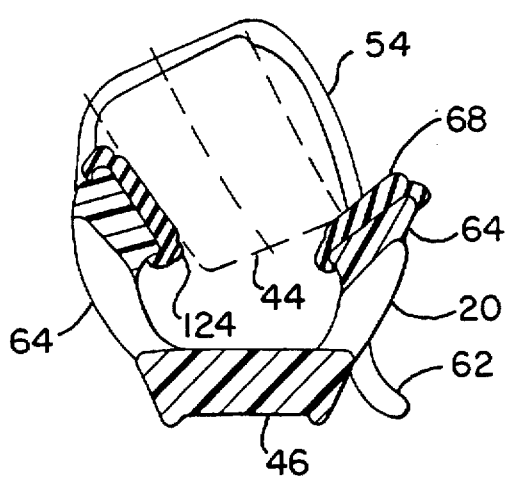
FIG. 10 is a cross-sectional view of the bracket of FIG. 1 engaging a pair of skis therein.

An alternative application of the bracket 20 is shown in FIG. 10. A set of skis 44 may be rested in a volume 124, and may be constructed to permit the supporting of skis between the resilient surfaces of the fingers 64. The skis would then be gripped between the two inclined planes defined by the four fingers which protrude upwardly and outwardly from the body. Hence a bicycle frame tube may be engaged by the four fingers, or, alternatively, skis may be supported.

It should be understood that an additional L-shaped member could be mounted on the hitch engaging member to support additional carrier brackets 98 and additional bicycles or skis. Furthermore, although the side of the bracket used to retain skis is shown as generally planar in configuration, it could have other shapes so long as the bracket defines a plane along which the skis may be held. Thus, any bracket with at least three points or features which are coplanar could serve the function of supporting skis. For example a V-shaped groove may be employed to grip the sides of skis.

Although the hinged connection of the brackets 20 is formed by a cylindrical opening 74, a portion of the bracket 20 forming the hinge need not completely surround the arm. Additionally, the rubber member 76 could be eliminated by incorporating into the bracket 20 a lever operated clamp. The bracket 20 can be used with numerous existing carrier racks of the type having two parallel extending arms. The carrier bracket 98, as illustrated in FIG. 7, could be utilized with numerous existing or new carrier racks which utilize one or more arms.

Another alternative embodiment carrier assembly 200 of this invention is shown in FIGS. 11–15. The carrier assembly 200 preferably includes a support member 202 which is connected to a vehicle attachment assembly 204, best shown in FIGS. 12–15. The support member 202 is preferably a steel tube which has a vertical segment 206 which is pivotably connected to the attachment assembly 204 and a horizontal segment 208 which extends rearwardly from the vehicle to which the carrier assembly 200 is mounted. The horizontal segment 208 is preferably cylindrical and at least one bracket 210 is positionably mounted thereon.

Figure 11:
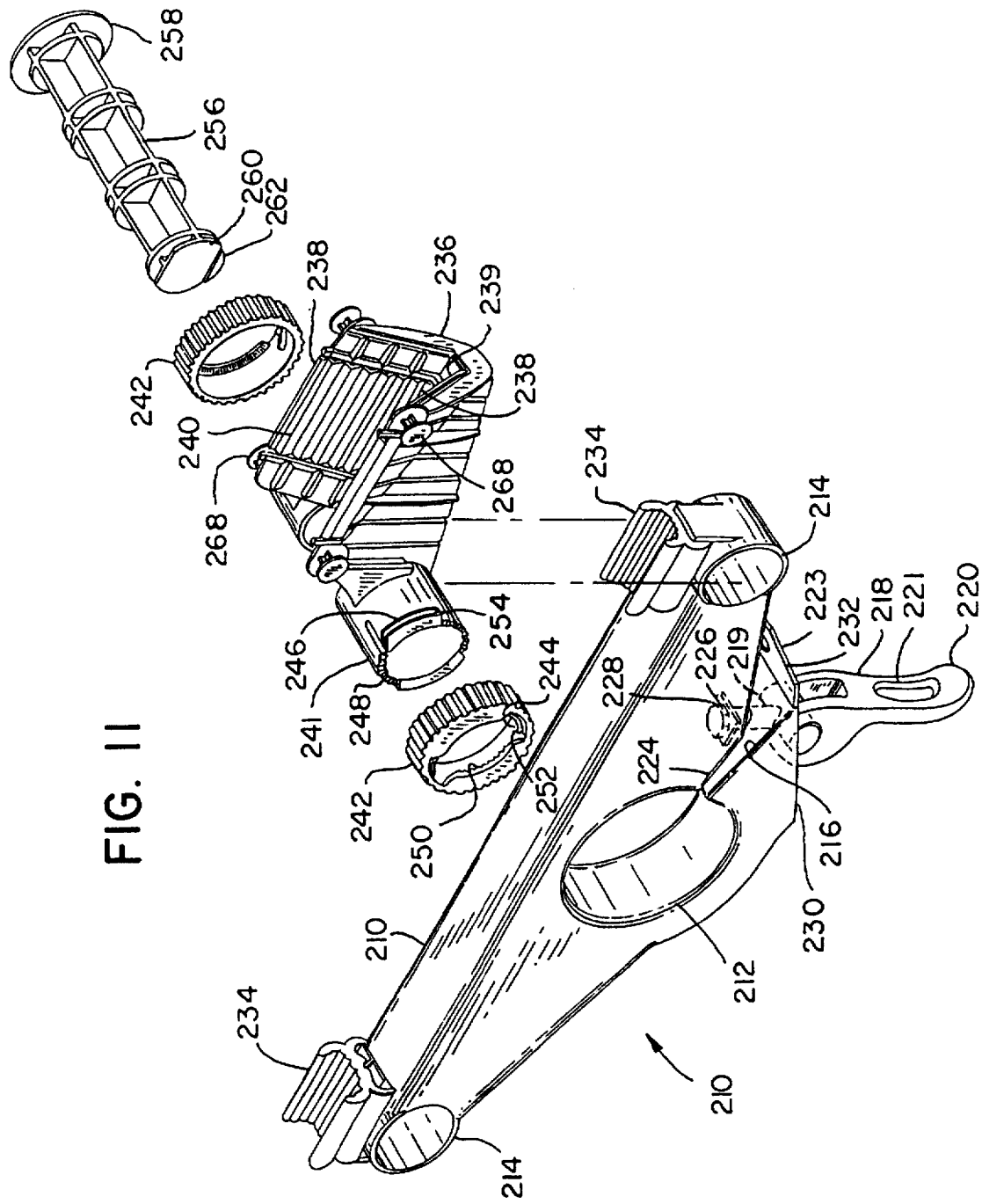
FIG. 11 is an exploded perspective view of an alternative embodiment bracket of this invention.
Figures 12, 12A:
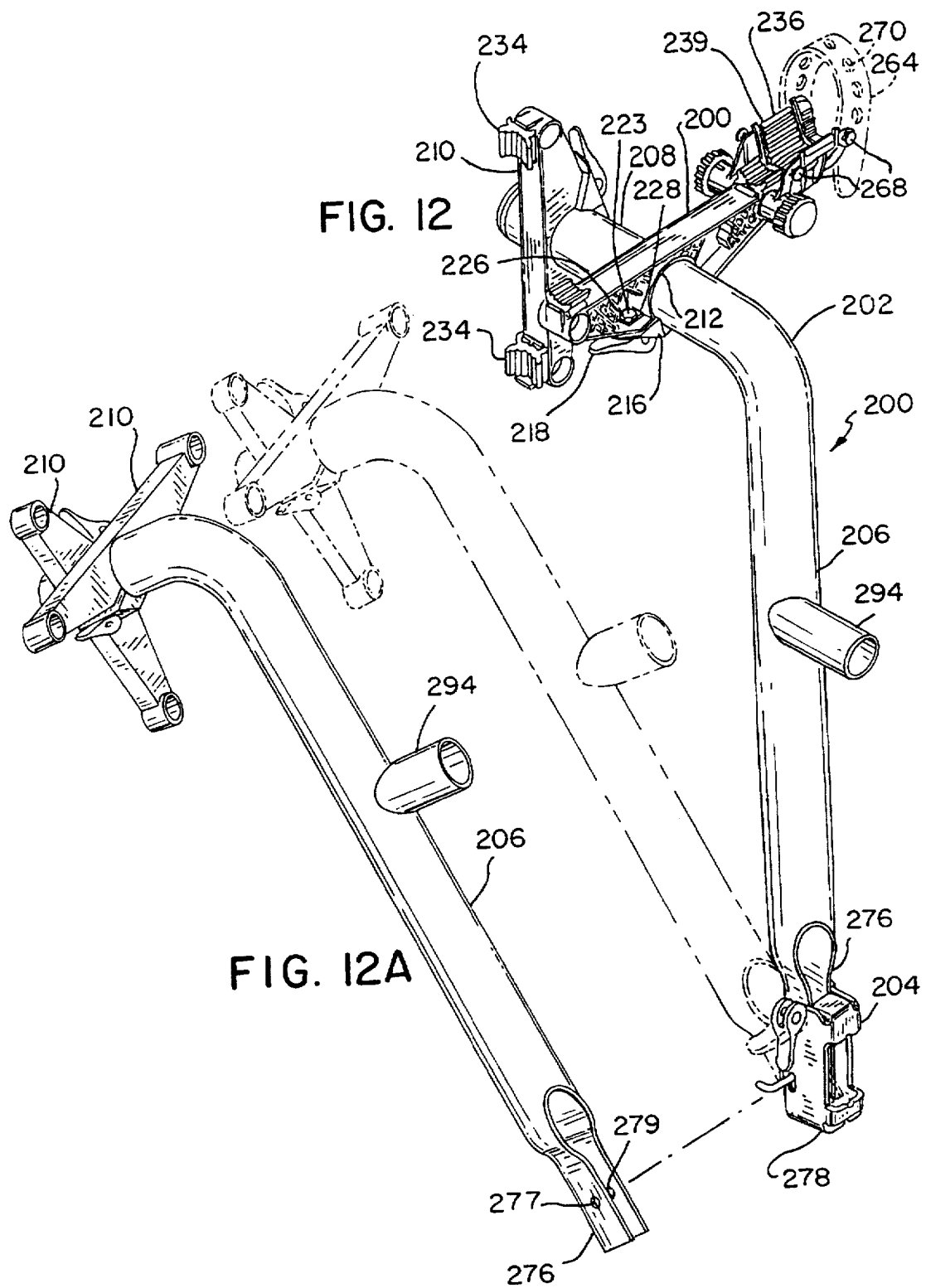
FIG. 12 is a rear perspective view of the bracket of FIG. 11 mounted to a support arm of this invention.
FIG. 12A is a rear perspective view of the support arm of FIG. 12.
Figure 13:
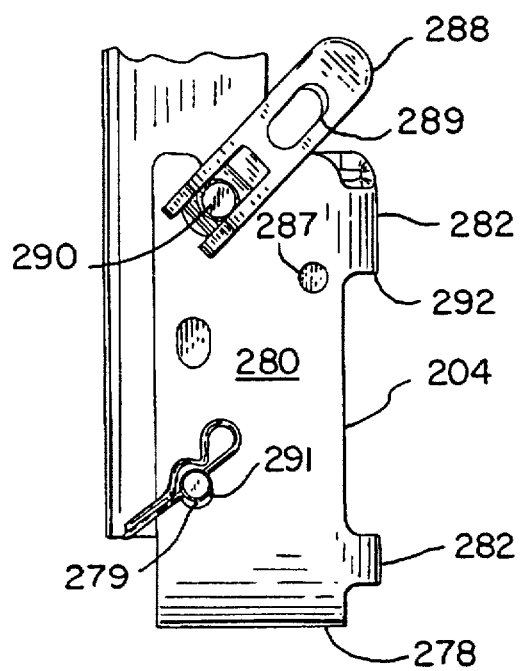
FIG. 13 is a fragmentary side elevational view of the support arm of FIG. 12.
Figure 14:
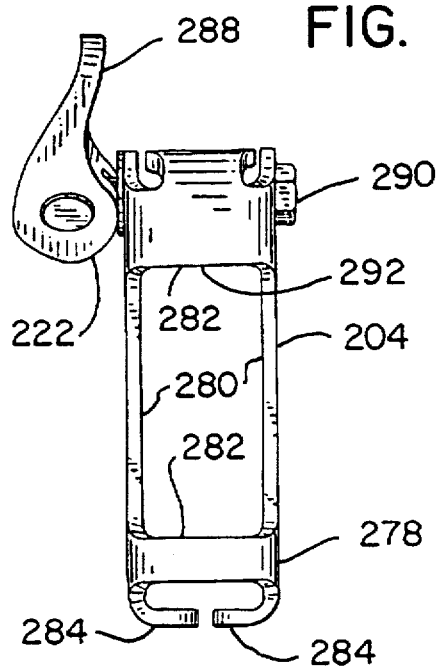
FIG. 14 is a fragmentary rear elevational view of the support arm of FIG. 12.
Figure 15:
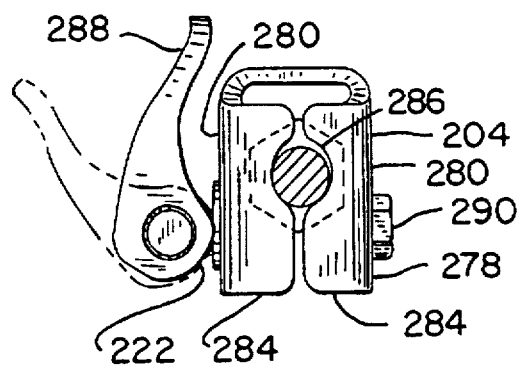
FIG. 15 is a fragmentary bottom plan view of the support arm of FIG. 12.

As shown in FIG. 11, the bracket 210 is a molded plastic part which has portions defining a central tube opening 212 and two side openings 214 which are cylindrical and all having parallel axes. The central tube opening 212 is dimensioned to allow the bracket to be slid onto and positioned along the horizontal segment 208 of the support member 202. An integral plastic tang 216 extends beneath and defines a portion of the tube opening 212. As shown in FIG. 12, the bracket 210 is releasably positioned on the support member 202 by a bracket clamping assembly 218. The clamping assembly has a locking handle 220 which has portions defining an off-axis cylindrical cam like the cam 222 shown in FIGS. 14 and 15. The handle 220 is connected to a bolt 219 which extends through the tang 216 and into the lower wall 224 of the bracket 210. The head 226 of the bolt 219 engages against a rectangular bar or washer 228 which is held against rotation by structure within the bracket 210. Unless forced, the locking handle 220 will be restrained against rotation and separation from the bolt 219 by the downwardly extending sidewalls 230 of the tang 216. The tang 216 has a planar end wall 232 which extends between the two sidewalls 230 and which is spaced from the bracket lower wall 224 when the bracket is in an unclamped condition. When the bracket is positioned as desired on the support member 202, the locking handle 220 is rotated to cause the cam portions to engage against the end wall 232 of the tang, thereby forcing the tang into closer engagement with the bracket wall 224 to clamp the plastic bracket 210 onto the metal support member 202.

A resilient tab 234 is connected in a snap fit to the bracket 210 above each side opening 214. The tabs 234 are preferably formed of an elastomeric plastic or rubber.

A bicycle tube holder 236, as best shown in FIG. 1, is pivotably mounted to each side opening 214 on a plastic dowel 256. The tube holder 236 is preferably of molded plastic and has inclined walls 238 which define a generally V-shaped trough 239 which engages with either a bicycle cross tube or down tube. By engaging the down tube of the bicycle, the tube holder 236 prevents unwanted forward and backward tilting of the bicycle while at the same time the bicycle is supported and held on the resilient tabs 234. The walls 238 are preferably covered with an elastomeric pad 240 to improve the frictional engagement between the holder and the bicycle and to prevent scratching or marring of the bicycle tubes.

The tube holders 236 are multifunctional accessories, which may be used in conjunction with a variety of different bicycle rack systems. When used in conjunction with the bracket 210, the tube holders are pivotable on the dowels 256, and sliding displacement on the dowel is not a concern. However, in an alternative carrier assembly 350, shown in FIG. 23, the holders 236 are mounted on the two parallel horizontal support arms 38 of the rack 22, such as the one shown in FIG. 1, or any rack of that type. The support arms 38 are approximately the same diameter as a dowel 256, and are typically formed of steel tubing. In such an application, it is desirable to engage the tube holder to the support arm 38 and prevent sliding. The tube holders 236 are thus provided with structure to facilitate this clamping.

A plastic split ring 241 extends sidewardly from each side wall 238 of the tube holder. A compression cap 242 has internal partial threads 244 which engage with external partial threads 246 formed on a split ring 241. A row of protruding ridges 248 extend axially from the split ring 241 adjacent each set of partial threads. Rows of recesses 250 are formed in each compression cap 242 to overlie and engage with the split ring ridges 248 when the cap is threaded onto the split ring. A small nubbin 252 protrudes from the partial threads 244 on the compression cap 242 which is positioned to limit the rotation of the cap when it engages against a stop 254 at the end of the partial threads 246 on the split ring 241.

The molded plastic dowel 256 has a head 258 and a foot 260 with a resilient tab 262. The dowel 256 extends through a first compression cap 242, a first split ring 241, a side opening 214 in the bracket 210, a second split ring 241 and a second compression cap 242. The resilient tab 262 is compressed when the dowel is being inserted, but springs back once the dowel is in position to restrain the dowel from disengagement.

In the carrier assembly 350, the caps 242 may be rotated with respect to the holder split rings 241 to bring the halves of the split ring closer together to clamp the holder 236 to a support arm 38.

The holders 236 may thus be positioned as desired to engage both the horizontal tube of a bicycle and the vertical seat tube. Thus the holder will thus prevent back and fourth motion of the vertical seat tube.

Alternatively, both holders 236 may be positioned in a parallel orientation so that skis may be supported on the bracket 210.

The bicycle tubes or skis are held to the holders 210 by one or two elastomeric tongues 264 which are snapped to the outside of the holder walls 238. Wide-head fasteners 268 extend from the holder walls 238 on each side of the trough 239. The tongue 264 is formed of elastomeric plastic or rubber, and has an array of aligned circular openings 270 which are smaller in diameter than the heads on the fasteners 268. Because the tongues 264 are elastic, the fasteners may be extended through the openings, and a length of tongue selected which is appropriate for the object restrained within the trough 239.

Figure 17:
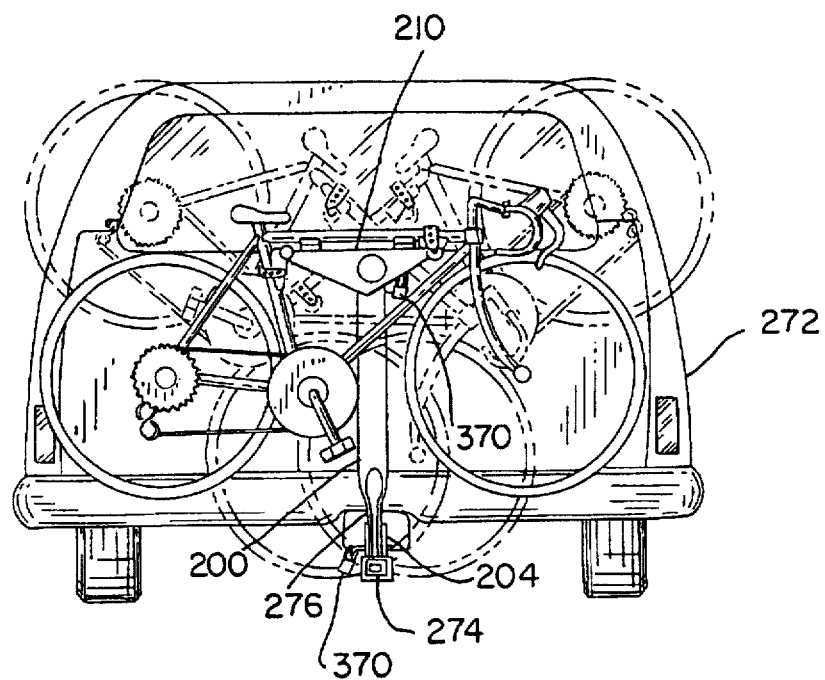
FIG. 17 is a rear elevational view of the support arm and multiple brackets of FIG. 12 mounted to the trailer hitch of a vehicle and supporting a plurality of bicycles.

Although a single bicycle may be carried on the support member 202 by a single bracket 210, as shown in FIG. 12, two or more brackets may be individually mounted to the support member 202 to support a plurality of bicycles. To avoid interference between bicycle handlebars, the bicycles may each be clamped at a different inclination, as shown in FIG. 17.

The carrier assembly 210 may be mounted to a vehicle 272 having a towing hitch 274 by means of the attachment assembly 204, shown in FIGS. 12–15. The support member 202 is stamped to fold half of the tube inward to define a narrowed width, but double thickness, U-shaped mounting end 276. The end 276 is formed in a one step die which collapses and the thin-walled tube forming the support member 202 into the double walled U-shaped mounting end 276. The formation of the end is completed by a second die which punches the bolt holes 277 and 279. The narrow mounting end 276 is of salutary stiffness, and yet is narrow enough to conveniently attach to a towing hitch of conventional dimensions. A stamped steel plate is formed into a brace 278 which encloses a portion of the mounting end. The brace 278 has two side plates 280 which are connected by two narrow rearwardly facing members 282. Two bottom plates 284 extend inwardly from the side plates 280. The bottom plates 284 have portions defining a single bolt hole 286 for attachment of the brace 278 to the towing hitch in cases where the hitch is a rearwardly extending plate. For vehicles having a square tubular towing hitch, the bottom plates 284 of the brace 278 may be welded to a square tube of dimensions adequate to engage within the tubular towing hitch.

The brace 278, although stiff in a vertical direction, is so constructed that the side plates 280 may be pivoted, under sufficient force, toward one another to effectively clamp the mounting end 276 of the support member 202. To achieve this clamping, the attachment assembly 204 includes a locking handle 288 which has portions defining an off-axis cylindrical cam, and which may be identical to the locking handle 220. The handle 288 is connected to a bolt 290 which extends through the two side plates 280 of the brace 278 and also through the upper bolt hole 277 in the mounting end 276 of the support member. A removable pin 291 fixes the end 276 to the braces 278 by passing through the two side plates 284 and the lower hole in the end 276. As shown in FIG. 17, when the carrier 200 is mounted to a vehicle, access to the rear door will be blocked. By pivoting the locking handle 288, and removing the pin 291 the support member may be released from its clamped connection with the brace and allowed to pivot downwardly on the bolt 290, permitting access to the vehicle rear door. Over-pivoting of the support member is prevented by a stop 292 formed in the rearwardly facing member 282 of the brace 278 behind the bolt 290.

Figure 16:
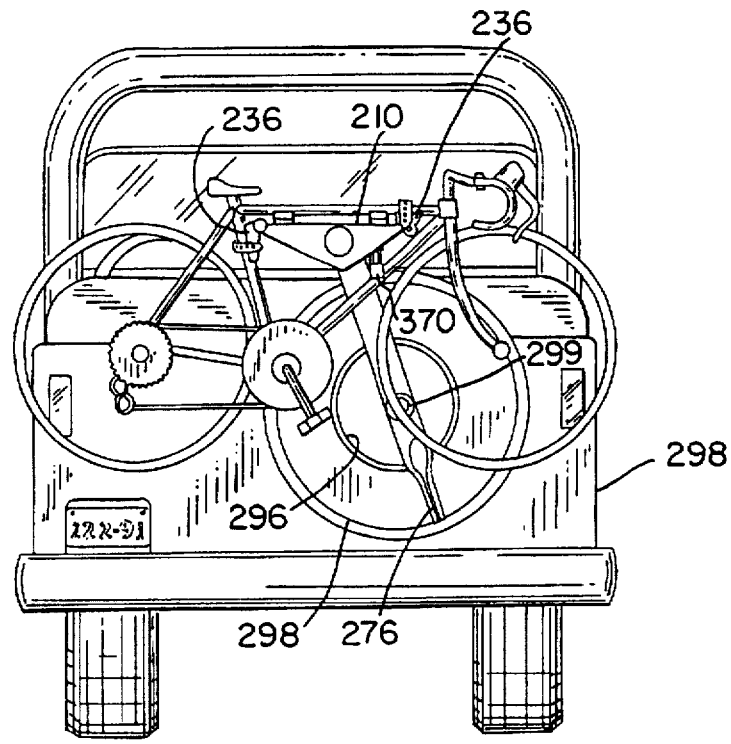
FIG. 16 is a rear elevational view of the support arm and bracket of FIG. 12 mounted to the spare tire mount of a vehicle.

The carrier assembly 200 can be employed with a rear tube 294 which may be extended into a spare tire mount 296 on a vehicle 298, as shown in FIG. 16, which has a rear mounted spare tire. A bolt 299 extends through the front of the support member and through the rear tube 294 to connect the carrier assembly 200 to the spare tire mount 296. The rear tube 294 slips over a square tube which is welded to a plate which is mounted the spare tire and over bolts to which the spare tire 298 is mounted. When mounted, the entire support tube 206 may be pivoted to best position the supported bicycles or skis with respect to the vehicle. The mounting end of the support member may then frictionally engage the spare tire 298 to hold the carrier assembly 200 in the proper orientation. Because the brackets 210 are infinitely adjustable, they may be positioned to take into account the inclination of the support tube to thus obtain the desired bicycle orientation.

Figure 22:
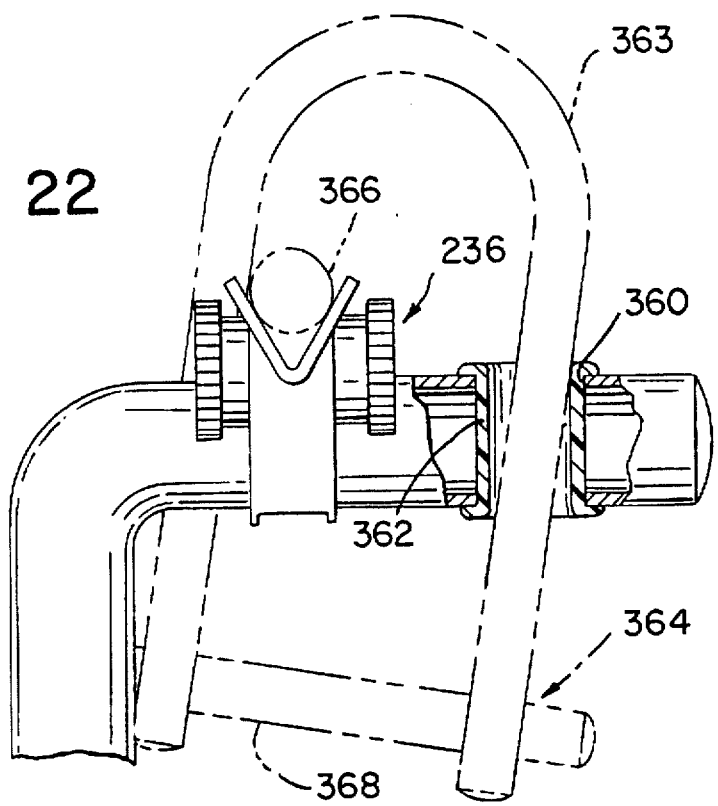
FIG. 22 is a fragmentary side elevational view, partially broken away in section of the device of FIG. 12 with a bicycle and lock shown in phantom view.
Figure 23:
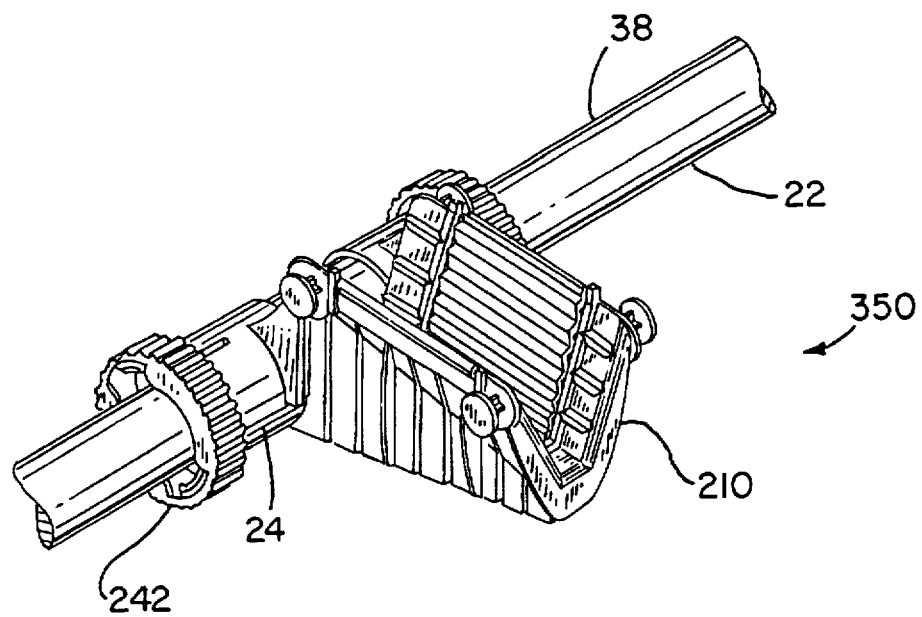
FIG. 23 is a fragmentary isometric view of the bracket of FIG. 11 mounted to an alternative embodiment support having two parallel horizontal support arms.

As shown in FIG. 22, the support member 202 is preferably formed with a through hole 360 which extends through the horizontal segment 208 rearward of the bracket 210. A cylindrical plastic boot 362 extends into the hole to restrict water penetration. One shaft of the hasp 363 of a U-shaped bicycle lock 364 may be passed through the boot 362 and the hole 360, and the hasp passed over the horizontal tube 366 of a bicycle. When the lock cross bar 368 is secured to the hasp 363, not only is the bicycle and the bracket 210 prevented from unauthorized removal from the horizontal segment 208 of the carrier assembly 200, but any additional brackets and bicycles forward of the locked bicycle are also prevented from removal. The support member 202 can be locked to the attachment assembly 204 by a lock 370 shown in FIG. 17 which passes through the hole 289 in the locking handle 288 and the locking hole 287 shown in FIG. 13. In a similar way a lock 370 as shown in FIG. 16 can be used to lock the locking handle 220 by passing the lock 370 through hole 221 in the handle 220 and hole 223 in the bracket 210.

Figure 18:
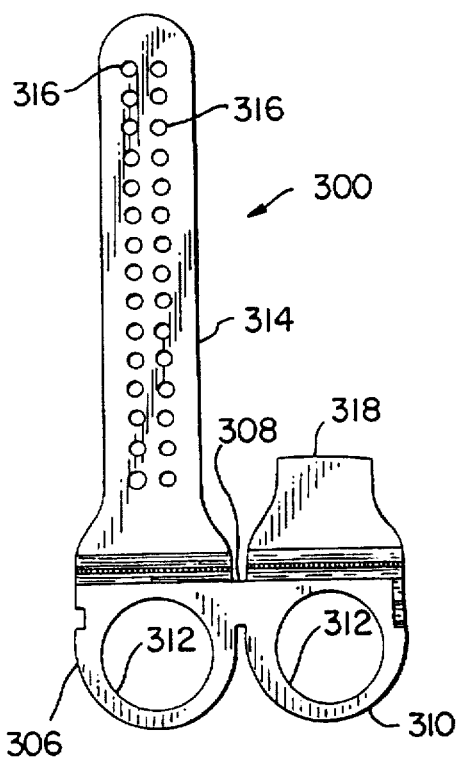
FIG. 18 is a side elevational view of a bicycle tube engaging member of this invention in unassembled condition.
Figure 19:
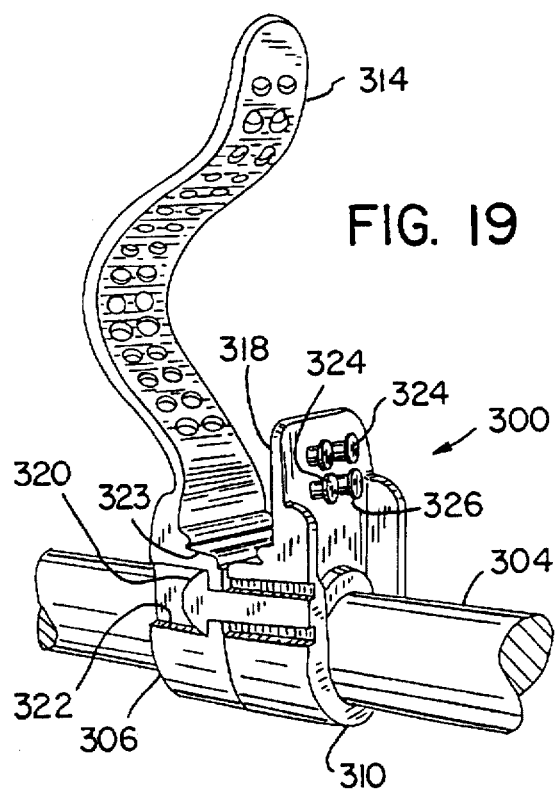
FIG. 19 is a perspective view of the device of FIG. 18 assembled on a bicycle support tube.
Figure 20:
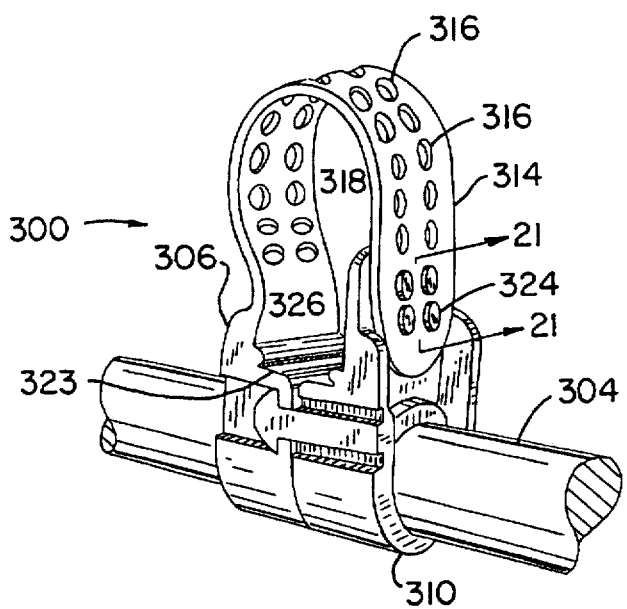
FIG. 20 is a perspective view of the assembled device of FIG. 19 in bicycle tube engaging configuration.

An alternative embodiment attachment device 300 for restraining a bicycle tube 302 on a horizontally extending carrier arm 304 is shown in FIGS. 18–21. As shown in FIG. 18, the attachment device 300 is preferably formed as a single molded part of the plastic known as AFFINITY SM 1300®, 305-02205-395 available from Dow Plastics. The attachment device 300 has a first ear 306 which is connected by a tab 308 to a second ear 310. The ears 306, 310 have through holes 312 which are approximately the same diameter as the carrier arm 304. A strap 314 extends from the first ear 306 and has an array of two rows of holes 316 of a selected diameter. The second ear 310 has a tab 318 extending therefrom. The ears 306, 310 may be pivoted about the tab 308 so that the through holes 312 are coaxial and so the device 300 may be slid into place along the carrier arm 304 as shown in FIG. 19. A flap 320 extends from the second ear 310 and engages within a recess 322 on the first ear 306 to retain the two ears in coaxial arrangement. As shown in FIG. 20, the strap 314 may be folded over the encircled bicycle tube 302, and snapped in position over a square array of four mushroom-head type fasteners 324 which extend from the tab 318. The bicycle tube 302 which extends transverse to the support arm 304 is then supported on a support surface 323 defined by the connected ears 306, 310.

Figure 21:
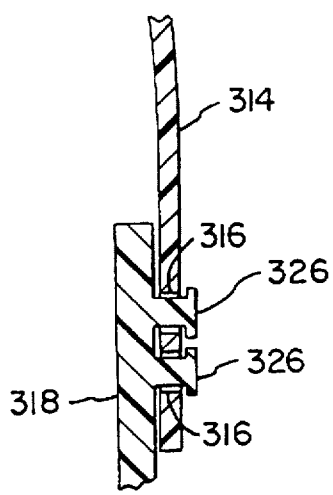
FIG. 21 is a fragmentary cross-sectional view of the device of FIG. 20 taken along section line 21—21.

As shown in FIG. 21, each fastener is in the form of a post which defines an axially extending tab 318 on the second ear 310. The fasteners 324 have a portion forming heads 326, which are distal from the tab 318. The heads extend radially to a diameter greater than the selected diameter of the holes 316 on the strap 314. An intermediate portion extends between the heads 326 and the tab 318 and is smaller in diameter than the distal portion 326 so that the subarray of the holes formed in the second end of the strap may be elastically deformed to pass over the mushroom heads 326 of the fasteners 324 in the array. The heads 326 of the fasteners 324 protrude through the holes 312 in the tongue and allow the adjustment of the grip of the attachment device 300 on the bicycle tube 302. Thus, strap 314 is elastically engaged and fixed to the mushroom-head type fasteners 324.

It is understood that the invention is not limited to the particular construction and arrangement of parts herein illustrated and described, but embraces such modified forms thereof as come within the scope of the following claims.

I claim:

1. A recreational equipment carrier for attachment to a vehicle comprising:
   a) a support member which has a first segment which extends upwardly with respect to the vehicle and a second segment which extends horizontally and rearwardly from the vehicle and defines an axis along which the second segment extends;
   b) a bracket which is pivotably mounted to the support member second segment to pivot about the second segment in a plane perpendicular to the defined axis;
   c) a first means for connecting an article of recreational equipment to the bracket, wherein the bracket and the connected article of recreational equipment are pivotable together on the support member second segment; and
   d) means for fixing the bracket at a desired orientation on the support member second segment;
   e) a brace which is releasably connected to the first segment of the support member, wherein the brace has means for attachment to a vehicle trailer hitch; and
   f) a pivotable clamping arm which is mounted to a pin which extends through the support member first segment and the brace, wherein the clamping arm has cam portions such that pivoting of the clamping arm selectably clamps the brace to the first segment, and unclamps the first segment to allow rearward pivoting of the support member with respect to the brace.

2. A recreational equipment carrier for attachment to a vehicle comprising:
   a) a support member which has a first segment which extends upwardly with respect to the vehicle and a second segment which extends horizontally and rearwardly from the vehicle and defines an axis along which the second segment extends;
   b) a bracket which is pivotably mounted to the support member second segment to pivot about the second segment in a plane perpendicular to the defined axis;
   c) a first means for connecting an article of recreational equipment to the bracket, wherein the bracket and the connected article of recreational equipment are pivotable together on the support member second segment; and
   d) means for fixing the bracket at a desired orientation on the support member second segment, wherein the first means for connecting an article of recreational equipment to the bracket comprises:
      a) two side walls which define a trough therebetween;
      b) two coaxial split rings which extend from the trough; and
      c) a dowel which extends through the two split rings and the bracket to pivotably mount the trough to the bracket.

3. The recreational equipment carrier of claim 2, wherein the first means for connecting an article of recreational equipment to the bracket further comprises:
   a) at least one fastener which protrudes outwardly from each of the trough side walls; and
   b) a flexible strap having a plurality of openings of a size to fit over a fastener, wherein one end of the strap is connected to a fastener on one side of the trough, and the strap extends over the trough and is fastened to another fastener on the other side of the strap to retain an element of the recreational equipment in engagement with the bracket.

4. A recreational equipment carrier for attachment to a vehicle comprising:

a support member which has a first segment which extends upwardly with respect to the vehicle and a second segment which extends horizontally and rearwardly from the vehicle and defines an axis along which the second segment extends;

a bracket which is pivotably mounted to the support member second segment to pivot about the second segment in a plane perpendicular to the defined axis;

a first means for connecting an article of recreational equipment to the bracket, wherein the bracket and the connected article of recreational equipment are pivotable together on the support member second segment; and means for fixing the bracket at a desired orientation on the support member second segment, wherein the means for fixing the bracket to the support member comprises:

a) a flexible plastic tang which extends from the bracket and which extends around a portion of the support member second segment;

b) a fastener which extends from the bracket through the tang; and c) a lever arm pivotably connected to the fastener and having cam portions which engage against the tang, such that pivoting of the lever arm brings the tang closer to the bracket to frictionally engage the bracket to the support member second segment.

5. A recreational equipment carrier for attachment to a vehicle comprising:

a) a support member which has a first segment which extends upwardly with respect to the vehicle and a second segment which extends horizontally and rearwardly from the vehicle and defines an axis along which the second segment extends;

b) a bracket which is pivotably mounted to the support member second segment to pivot about the second segment in a plane perpendicular to the defined axis;

c) a first means for connecting an article of recreational equipment to the bracket, wherein the bracket and the connected article of recreational equipment are pivotable together on the support member second segment; and d) means for fixing the bracket at a desired orientation on the support member second segment, wherein the article of recreational equipment is a bicycle and wherein portions of the support member second segment define a through hole which extends through the second segment rearward of the bracket, such that one shaft of the hasp of a U-shaped bicycle lock may be passed through the hole and the hasp passed over the horizontal tube of the bicycle to secure the bicycle and the bracket against unauthorized removal from the second segment of the support member.

6. The recreational equipment carrier of claim 5 further comprising a boot which extends into the hole to restrict water penetration.

7. A recreational equipment holder for attachment to a horizontally extending segment of a vehicle mounted support, the holder comprising:

a) two side walls which define a trough therebetween for engaging an element of the recreational equipment;

b) two coaxial split rings which extend from the trough, each split ring having an opening through which the support segment extends; and c) a compression cap threadedly mounted to each split ring, wherein rotation of the compressions caps causes a reduction in diameter of the split ring and thereby clamps the holder to the vehicle mounted support.

8. The recreational equipment holder of claim 7 wherein each compression cap has internal partial threads which engage with external partial threads formed on a split ring.

9. The recreational equipment holder of claim 8 further comprising:

a) a row of protruding ridges which extend axially from at least one of the split rings adjacent the partial threads;

b) a row of recesses formed in at least one of the compression caps to overlie and engage with the split ring ridges when the cap is threaded onto the at least one split ring.

10. The recreational equipment holder of claim 9 further comprising:

a) a small nubbin which protrudes from at least one of the partial threads on at least one of the compression caps within; and b) a stop at the end of the at least one partial threads on the at least one split ring, wherein the nubbin is positioned to limit the rotation of the at least one cap by engagement against the stop.

11. The recreational equipment carrier of claim 7 further comprising:

a) at least one fastener which protrudes outwardly from each of the trough side walls; and b) a flexible strap having a plurality of openings of a size to fit over a fastener, wherein one end of the strap is connected to a fastener on one side of the trough, and the strap extends over the trough and is fastened to another fastener on the other side of the strap to retain an element of the recreational equipment in engagement with the bracket.

* * * * *